(12) United States Patent
Greil et al.

(10) Patent No.: US 10,576,911 B2
(45) Date of Patent: Mar. 3, 2020

(54) SHIELDING DEVICE, PASSENGER COMPARTMENT, MOTOR VEHICLE, AND SHIELDING METHOD

(71) Applicant: Bayerische Motoren Werke Aktiengesellschaft, Munich (DE)

(72) Inventors: Juergen Greil, Woerthsee (DE); Josef Baeumel, Mauern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 140 days.

(21) Appl. No.: 15/665,811

(22) Filed: Aug. 1, 2017

(65) Prior Publication Data

US 2017/0327057 A1    Nov. 16, 2017

Related U.S. Application Data

(63) Continuation of application No. PCT/EP2016/050743, filed on Jan. 15, 2016.

(30) Foreign Application Priority Data

Feb. 2, 2015    (DE) .................... 10 2015 201 710

(51) Int. Cl.
*B60R 13/08*    (2006.01)
*B60K 15/07*    (2006.01)
(Continued)

(52) U.S. Cl.
CPC ............ *B60R 13/083* (2013.01); *B60K 15/07* (2013.01); *B60R 13/08* (2013.01);
(Continued)

(58) Field of Classification Search
CPC ....... B60R 13/083; B60R 13/08; B60K 15/07; B62D 25/2072; C23C 30/00
(Continued)

(56) References Cited

U.S. PATENT DOCUMENTS 5,836,712 A    11/1998    Zetterstroem
6,913,815 B2 *    7/2005    Watanabe ............... B32B 15/08
428/212

(Continued)

FOREIGN PATENT DOCUMENTS

DE    198 35 194 A1    2/2000
DE    695 22 950 T2    8/2002

(Continued)

OTHER PUBLICATIONS

International Search Report (PCT/ISA/210) issued in PCT Application No. PCT/EP2016/050743 dated Apr. 12, 2016 with English translation (Six (6) pages).

(Continued)

*Primary Examiner* — Joseph D. Pape
(74) *Attorney, Agent, or Firm* — Crowell & Moring LLP

(57) ABSTRACT

A shielding device of a passenger compartment of a motor vehicle for shielding an interior of the passenger compartment from a hydrogen tank in the motor vehicle includes a basic body. The basic body has a fiber-reinforced composite material with a hydrogen-permeation-inhibiting coating. The basic body is constructed as a wall or wall segment of the passenger compartment.

12 Claims, 3 Drawing Sheets

(51) Int. Cl.
  *B62D 25/20* (2006.01)
  *C23C 30/00* (2006.01)
  *B60K 15/03* (2006.01)
  *B60K 15/063* (2006.01)
  *B29L 31/30* (2006.01)

(52) U.S. Cl.
  CPC .......... *B62D 25/2072* (2013.01); *C23C 30/00* (2013.01); *B29L 2031/3017* (2013.01); *B32B 2255/205* (2013.01); *B60K 2015/03315* (2013.01); *B60K 2015/0634* (2013.01)

(58) Field of Classification Search
  USPC ....................... 296/181.2, 901.01, 39.1, 39.3
  See application file for complete search history.

(56) References Cited

U.S. PATENT DOCUMENTS

| | | | |
|---|---|---|---|
| 7,059,665 B2* | 6/2006 | Murai | B29C 70/22 296/181.2 |
| 9,010,834 B2* | 4/2015 | Preisler | B60N 2/91 296/39.3 |
| 2004/0109853 A1* | 6/2004 | McDaniel | A62D 3/02 424/94.6 |
| 2005/0176880 A1* | 8/2005 | Fujii | C09D 175/12 524/589 |
| 2006/0032532 A1 | 2/2006 | Suess et al. | |
| 2006/0084332 A1 | 4/2006 | Muschelknautz et al. | |
| 2008/0249209 A1* | 10/2008 | Trummer | C09C 1/0021 523/200 |
| 2011/0302933 A1 | 12/2011 | Immel | |
| 2013/0147232 A1* | 6/2013 | Min | B62D 29/043 296/181.2 |
| 2013/0310510 A1* | 11/2013 | Butera | C08F 290/046 524/533 |
| 2016/0200191 A1* | 7/2016 | Ito | B60K 15/073 280/834 |

FOREIGN PATENT DOCUMENTS

| | | |
|---|---|---|
| DE | 102 02 232 A1 | 8/2003 |
| DE | 10 2005 037 637 A1 | 4/2006 |
| DE | 10 2008 019 594 A1 | 10/2009 |
| DE | 10 2009 024 796 A1 | 12/2010 |
| DE | 10 2012 210 137 A1 | 12/2013 |
| EP | 1 596 121 A1 | 11/2005 |

OTHER PUBLICATIONS

German-language Written Opinion (PCT/ISA/237) issued in PCT Application No. PCT/EP2016/050743 dated Apr. 12, 2016 (Six (6) pages).

German-language Search Report issued in counterpart German Application No. 10 2015 201 710.9 dated Jan. 21, 2016 with partial English translation (Eleven (11) pages).

Chinese-language Office Action issued in counterpart Chinese Application No. 201680003717.9 dated Nov. 2, 2018 with English translation (16 pages).

* cited by examiner

SHIELDING DEVICE, PASSENGER COMPARTMENT, MOTOR VEHICLE, AND SHIELDING METHOD

CROSS REFERENCE TO RELATED APPLICATIONS

This application is a continuation of PCT International Application No. PCT/EP2016/050743, filed Jan. 15, 2016, which claims priority under 35 U.S.C. § 119 from German Patent Application No. 10 2015 201 710.9, filed Feb. 2, 2015, the entire disclosures of which are herein expressly incorporated by reference.

BACKGROUND AND SUMMARY OF THE INVENTION

Embodiments of the present invention relate to a shielding device of a passenger compartment of a motor vehicle for shielding an interior of the passenger compartment from a hydrogen tank in the motor vehicle. The embodiments further relate to a passenger compartment of a motor vehicle as well as to a motor vehicle. Furthermore, the embodiments relate to a method for shielding an interior of a passenger compartment of a motor vehicle from a hydrogen tank in the motor vehicle.

Drive concepts for motor vehicles on the basis of fossil fuels have dominated the automobile industry for decades, because fossil fuels have a relatively high energy density and can be relatively securely stored in corresponding tanks by means of simple devices. However, fossil fuels have the disadvantage that they are present and available only to a limited extent. Particularly because of a continuously rising worldwide demand of energy for purposes of locomotion or the generation of power, fossil fuels will not be available over the long term. Furthermore, the combustion of fossil fuel causes pollutants, such as carbon dioxide and carbon monoxide, which have a particularly negative effect on the global climate.

Research with respect to finding new drive concepts that are based on alternative sources of energy is therefore carried out especially in the automobile industry. In particular, there is a search for energy sources that have an especially high energy density and, therefore a small volume or a small mass relative to their stored energy, because the installation space for the storage of the energy source is very limited in the case of motor vehicles.

An alternative drive concept for the combustion of fossil fuels, such as gasoline, is hydrogen technology, because liquid hydrogen has a relatively high energy density and can be converted to electric energy, for example, for driving an electric motor, in a fuel cell. Furthermore, raw materials for generating hydrogen are available to an almost unlimited extent, in which case the economic viability of methods for generating hydrogen is constantly being improved.

A considerable disadvantage of hydrogen technology is the operational safety in the case of motor vehicles, particularly in the context of accident situations. Hydrogen is gaseous at 20° C. and 1,000 hPa as well as highly explosive. Accordingly, particularly high demands are made, for example, on a hydrogen tank constructed for the storage of hydrogen, so that when designing the hydrogen tank of a motor vehicle based on hydrogen technology, possible accident situations also have to be taken into account.

Because of the high explosion danger emanating from hydrogen, further constructive precautions are to be carried out at the motor vehicle, which take into account conceivable damage to the hydrogen tank that could lead to the discharge of hydrogen. This includes, for example, that a penetration of hydrogen from a defective hydrogen tank into the passenger compartment is to be avoided by constructive measures, because such a penetration represents an extreme risk to the driver of the motor vehicle as a result of the connected danger of explosion.

A further approach to the construction of progressive motor vehicles is based on the reduction of the total weight of the motor vehicle because, for the acceleration of a smaller mass, also less energy is required. In this case, fiber-reinforced materials or fiber-reinforced composites have proven themselves, because they have a relatively high strength, while their own weight is relatively low. For a shielding from outside influences, while the vehicle weight is relatively low, modern passenger compartments therefore have walls that have fiber-reinforced composites or are formed essentially of fiber-reinforced composites.

Walls made of fiber-reinforced composite material have the disadvantage that, compared with walls made of metal, they provide a relatively poor shielding with respect to a hydrogen tank, and hydrogen can relatively easily diffuse through walls made of fiber-reinforced composites. This process is also called hydrogen permeation. Motor vehicles of this type therefore have shielding plates made of metal, which are arranged between the hydrogen tank and the exterior wall of the passenger compartment. The hydrogen cannot penetrate the shielding plates and escapes sideward. A penetration of the hydrogen into the passenger compartment can therefore be effectively prevented.

Shielding plates of this type have the significant disadvantage that they require additional installation space, and the hydrogen tank therefore has to have smaller dimensions while the vehicle size is the same. It is a further disadvantage of the shielding plates that the total weight of the motor vehicle is increased as a result of the shielding plate.

It is therefore one of the objects of the present invention to at least partially eliminate the above-described disadvantages of the state of the art. In particular, an object of the present invention is to provide a shielding device of a passenger compartment of a motor vehicle for shielding an interior of the passenger compartment with respect to a hydrogen tank in the motor vehicle, and to provide a passenger compartment as well as a motor vehicle, which have an improved protection of the interior of the passenger compartment from a hydrogen tank. Furthermore, another object of the present invention is to provide a method of shielding an interior of a passenger compartment of a motor vehicle with respect to a hydrogen tank in the motor vehicle, which ensures improved protection of the interior of the passenger compartment from a hydrogen tank.

According to the embodiments of the invention, the above-mentioned objects are achieved by a shielding device of a passenger compartment of a motor vehicle for shielding an interior of the passenger compartment from a hydrogen tank in the motor.

Further characteristics and details, which are described in connection with the shielding devices according to the embodiments of the invention, naturally also apply to the inventive passenger compartment, the inventive vehicle as well as the inventive method for shielding an interior of a passenger compartment of a vehicle from a hydrogen tank in the motor vehicle and, in each case, vice versa, so that with respect to the disclosure of the individual aspects of the invention, reference is made or always can be made reciprocally. The inventive shielding device and the inventive passenger compartment can naturally also be used within the scope of the method of shielding an interior of a passenger compartment of a motor vehicle from a hydrogen tank in the motor vehicle.

The inventive shielding device of a passenger compartment of a motor vehicle for shielding an interior of the passenger compartment from a hydrogen tank in the motor vehicle has a basic body. The basic body has a fiber-reinforced composite material with a hydrogen-permeation-inhibiting coating and is constructed as a wall or wall segment of the passenger compartment.

Within the meaning of the invention, a shielding device is a device which protects an object or a space from an effect of a medium, particularly gaseous hydrogen, at least within the range of the shielding device. The inventive shielding device is therefore constructed for blocking or at least essentially inhibiting a permeation of hydrogen through the shielding device. In this case, an inhibiting effect of the shielding device against hydrogen permeation is clearly higher than in the case of a component of the same dimension that has no hydrogen-permeation-inhibiting coating.

The interior of the motor vehicle is the space which, in particular, is constructed for the accommodation of the seats and the fittings of the motor vehicle. It may be provided that, within the meaning of the invention, a luggage compartment may be considered to be a component of the interior. This applies particularly if the hydrogen tank is arranged outside the luggage compartment.

The interior is surrounded by the passenger compartment. The passenger compartment has at least one wall, which shields the interior toward the outside, for example, from moisture, dirt, heat, sun radiation or the like. The passenger compartment preferably has several walls. At least one wall has a fiber-reinforced composite material or is formed or at least essentially formed of a fiber-reinforced composite material. A particularly high proportion of fiber-reinforced composite material per wall is preferred, in which case it is further preferred that as many walls as possible of the passenger compartment have a fiber-reinforced composite material. The vehicle weight can be reduced in this manner.

The basic body of the shielding device is constructed as a wall or wall segment of the passenger compartment and thereby shields the interior of the passenger compartment at least in one direction toward the outside. The basic body has a fiber-reinforced composite material. The basic body is preferably formed or at least essentially formed of a fiber-reinforced composite material. The basic body has a hydrogen-permeation-inhibiting coating. A hydrogen-permeation-inhibiting coating is a coating that cannot be penetrated by hydrogen or can be penetrated only with great difficulty. A hydrogen permeability of a basic body having such a hydrogen-permeation-inhibiting coating is therefore clearly less than in the case of a basic body that has no hydrogen-permeation-inhibiting coating.

The hydrogen-permeation-inhibiting coating is preferably arranged on at least one side of the basic body, but may also be arranged on both sides. Particularly preferably, the side of the basic body has the hydrogen-permeation-inhibiting coating, which faces the hydrogen tank. This has the advantage that a penetration of hydrogen into the basic body is prevented or essentially prevented.

A fiber-reinforced plastic material is particularly preferred as the fiber-reinforced composite material. Carbon fibers, glass fibers or aramid fibers are preferred as reinforcing fibers.

The inventive shielding device of a passenger compartment of a motor vehicle for shielding an interior of the occupant compartment from a hydrogen tank in the motor vehicle has the advantage that an interior can be shielded from a hydrogen tank by means of simple devices. This only marginally increases the vehicle weight because no additional shielding plate for the passenger compartment is required, and the own weight of the coating is negligible. Since the basic body has a fiber-reinforced composite material or is formed essentially of a fiber-reinforced composite material, the own weight of the basic body is less than that of a comparable plate made of metal. It is a further advantage that, as a result of the saving of an additional shielding plate, more space is available for the hydrogen tank within an available installation space, so that the latter can have a larger dimension in order to accommodate more hydrogen. The range of the vehicle is thereby increased in a cost-effective manner.

The hydrogen-permeation-inhibiting coating may have metallic pigments. Such pigments are particularly suitable for the coating because metals have very good hydrogen-permeation-inhibiting characteristics.

The hydrogen-permeation-inhibiting coating may have Cu and/or Al pigments. Such pigments are cost-effective and have particularly good hydrogen-permeation-inhibiting characteristics.

Also advantageously, the metallic pigments have a plate-shaped or small-plate-shaped design. Within the meaning of the invention, "plate-shaped" and "small-plate-shaped" relates to a spatial design, in which a ratio of side lengths to the thickness of an object is particularly large. Such pigments have the advantage that they are particularly suitable for the essentially dense covering of a surface of the basic body, while forming a relatively thin layer thickness.

The hydrogen-permeation-inhibiting coating preferably has a lacquer for binding metallic pigments. A lacquer has the advantage that a good binding effect can be achieved between the basic body and the lacquer with the pigments. Furthermore, a lacquer also permits a wetting of contours of the basic body, which are difficult to access, for example, possible undercuts. A continuous coating can thereby be applied to the basic body.

Particularly preferably, the shielding device is constructed as a floor wall or floor wall segment of the passenger compartment. Hydrogen is lighter than air, so that released hydrogen will escape in the upward direction. Furthermore, hydrogen tanks are often arranged below the passenger compartment. Hydrogen escaping from such a defective hydrogen tank will therefore escape in the direction of the floor wall of the passenger compartment. A hydrogen-permeation-inhibiting coating is therefore particularly advantageous.

A protective coating may be arranged on the hydrogen-permeation-inhibiting coating, the protective coating having a higher chemical and/or physical resistance than the hydrogen-permeation-inhibiting coating. In this case, chemical resistance is aimed particularly at chemical substances, such as road salt, to which the hydrogen-permeation-inhibiting coating is exposed according to its intended use. A physical resistance is aimed at physical stress, to which the hydrogen-permeation-inhibiting coating is exposed during its intended use, for example, temperature fluctuations or vibrations. A protective coating therefore has the advantage that a resistance of the hydrogen-permeation-inhibiting coating is improved.

A passenger compartment of a motor vehicle may have at least one outside wall for separating the passenger compartment from an environment of the passenger compartment. The at least one outside wall is constructed at least partly as the shielding device according to the invention. A passenger compartment according to the invention has the advantage that, while the size of the motor vehicle is constant, a larger hydrogen tank than in the case of conventional passenger compartments can be arranged, in which case the interior is effectively shielded from the hydrogen tank.

A motor vehicle having a hydrogen tank which has a passenger compartment, in which at least one wall segment of the passenger compartment, which is adjacent to the hydrogen tank, may be constructed as a shielding device. Particularly, a larger wall segment or the complete tank-side wall may be constructed as a shielding device.

Advantageously, in accordance with the inventive motor vehicle, while the construction size of a motor vehicle is constant, a larger hydrogen tank than in the case of conventional motor vehicles can be arranged, in which case, the interior of the passenger compartment is effectively shielded from a hydrogen tank.

Am inventive method of shielding an interior of a passenger compartment of a motor vehicle from a hydrogen tank in the motor vehicle includes providing a passenger compartment having at least one outside wall, in which at least one outside wall has a basic body, and in which the basic body has a fiber-reinforced composite material and is arranged between the interior and a receiving device for a hydrogen tank. The inventive method also includes applying a hydrogen-permeation-inhibiting coating to the basic body.

Within the scope of the invention, it is not significant in which sequence these process steps are carried out, so that it may be provided within the scope of the invention that the basic body is first coated with the hydrogen-permeation-inhibiting coating and is subsequently used for the providing of the passenger compartment. However, preferably, the passenger compartment is first provided with the at least one outside wall and the basic body is coated subsequently.

The application of the hydrogen-permeation-inhibiting coating preferably takes place by a spraying process. As an alternative, this can take place by almost any coating method known from the state of the art. It is preferable for a hydrogen-permeation-inhibiting coating to be generated that is as uniform as possible, preferably also coating undercuts, corners and edges of the basic body.

The inventive method has the advantage that the interior is shielded from a hydrogen tank by means of simple devices as well as in a cost-effective manner. The vehicle weight is not significantly increased. In addition, the inventive method makes it possible that, while the construction size of the motor vehicle is constant, a larger hydrogen tank can be arranged on the motor vehicle than in the case of conventional methods.

The hydrogen-permeation-inhibiting coating preferably has metallic pigments. Such pigments are particularly suitable for the coating, because metals have very good hydrogen-permeation-inhibiting characteristics.

Preferably, a protective coating is applied to the hydrogen-permeation-inhibiting coating, the protective coating having a higher chemical and/or physical resistance than the hydrogen-permeation-inhibiting coating. A protective coating therefore has the advantage that a resistance of the hydrogen-permeation-inhibiting coating is improved.

Other objects, advantages and novel features of the embodiments of the present invention will become apparent from the following detailed description of one or more embodiments when considered in conjunction with the accompanying drawings, in which:

DETAILED DESCRIPTION OF THE DRAWINGS

Figure 1:
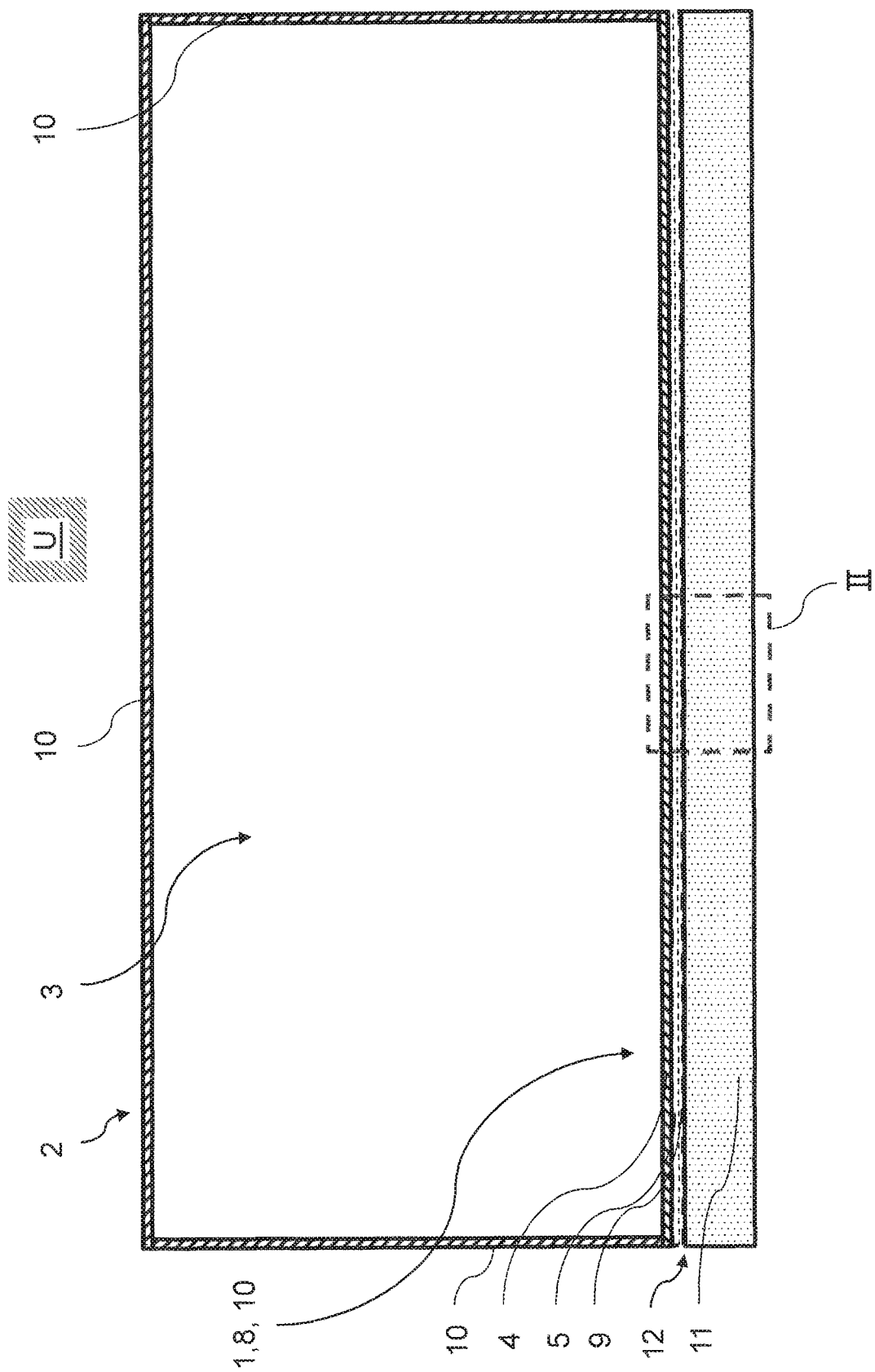
FIG. 1 is a schematic lateral view of a passenger compartment having the inventive shielding device.

FIG. 1 is a lateral view of a passenger compartment 2 having hydrogen tank 11 arranged below the latter on receiving device 12, which hydrogen tank 11 in this example extends essentially along an entire length of the passenger compartment 2.

The passenger compartment 2 has an interior 3 which is surrounded by exterior walls 10 and is therefore protected from outside influences, for example, rain and wind. A bottom exterior wall 10 is constructed as a floor wall 8, in this embodiment, the entire floor wall 8 being constructed as a shielding device 1. This is advantageous because the hydrogen tank 11 extends at least essentially along the entire length of the floor wall 8.

The shielding device 1 has a basic body 4 having a hydrogen-permeation-inhibiting coating 5, which is arranged between the hydrogen tank 11 and the basic body. Hydrogen escaping from the hydrogen tank 11 is thereby prevented by the hydrogen-permeation-inhibiting coating 5 of the shielding device 1 from penetrating into the interior 3 of the passenger compartment 2 by way of the floor wall 8.

The shielding device 1 may have an optional protective coating 9, in which case the hydrogen-permeation-inhibiting coating 5 is arranged between the protective coating 9 and the basic body 4. The protective coating 9 protects the hydrogen-permeation-inhibiting coating 5, for example, from erosion.

Figure 2:
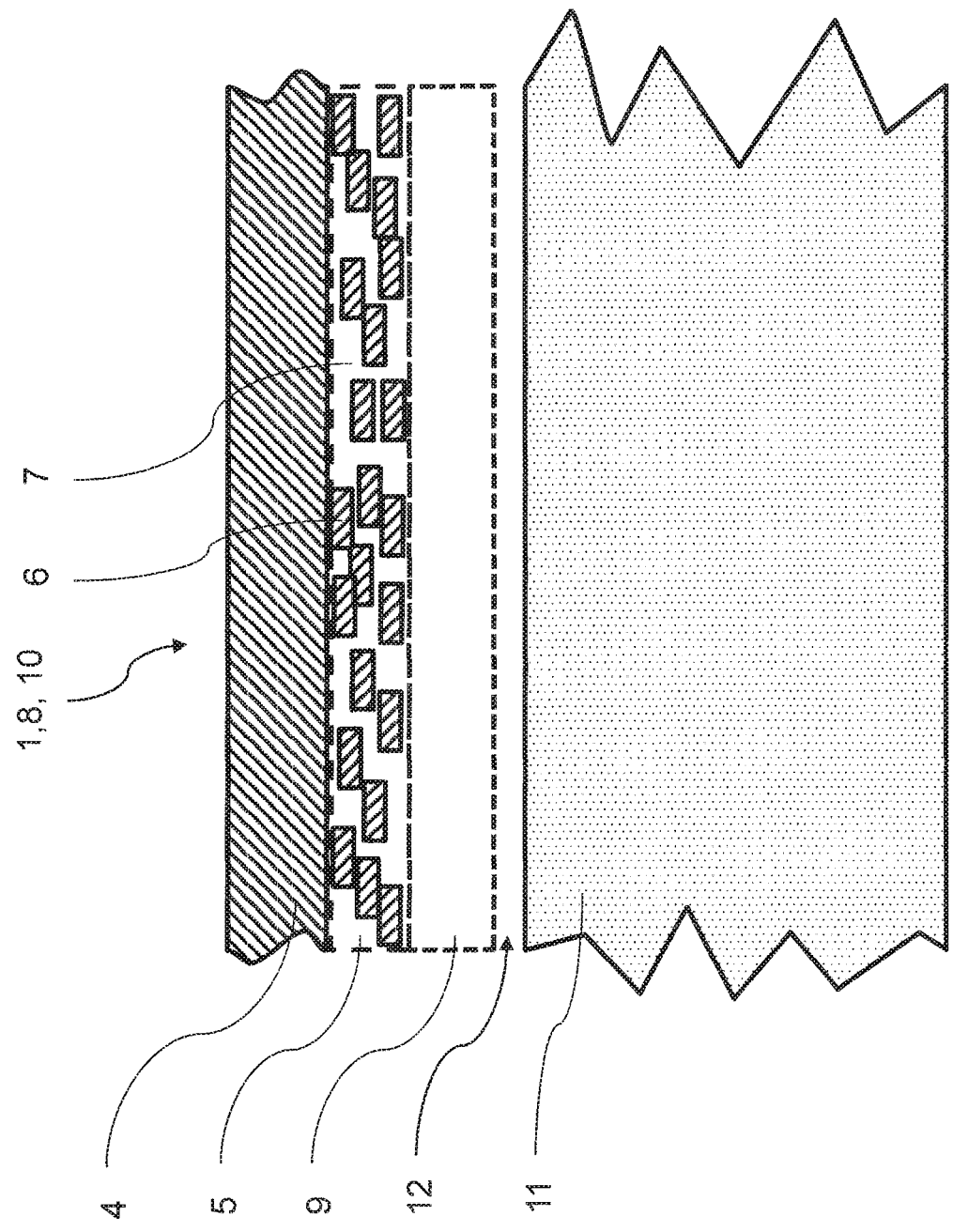
FIG. 2 is a schematic view of an enlarged detail of the inventive shielding device of FIG. 2.

FIG. 2 illustrates an enlarged detail of the shielding device 1 as well as of the hydrogen tank 11 from FIG. 1. FIG. 2 particularly illustrates that, in this embodiment, the hydrogen-permeation-inhibiting coating 5 has a lacquer 7, in which plate-shaped metallic pigments 6 are arranged. Such pigments 6 are particularly suitable for the inhibition of hydrogen permeation. The pigments 6 preferably form a continuous or essentially continuous layer, because spaces between the pigments 6 cause a poorer inhibition of the hydrogen permeation than the pigments 6. Such an arrangement therefore promotes an efficient shielding of the basic body 4 from hydrogen. A protective coating 9 is applied to the hydrogen-permeation-inhibiting coating 5.

Figure 3:
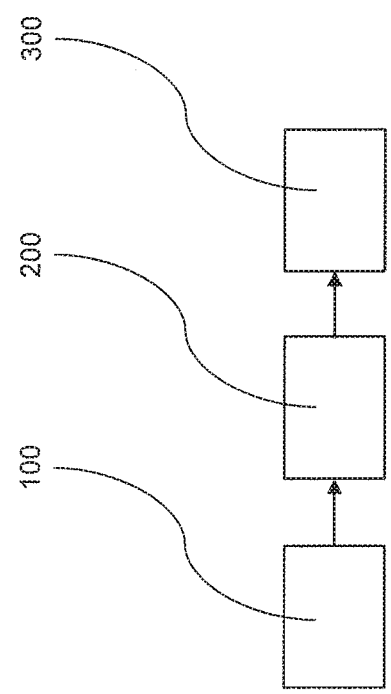
FIG. 3 is a schematic view of a flow chart of the inventive method.

FIG. 3 is a schematic view of as flow chart of the inventive method. In a first process step 100, a passenger compartment 2 having at least one exterior wall 10 is provided, the at least one exterior wall 10 having a basic body 4. In an arrangement of the passenger compartment 2 and the hydrogen tank 11 according to FIG. 1, the at least one exterior wall 10 is constructed as a floor wall 8. The basic body 4 has a fiber-reinforced composite material and is arranged between the interior 3 and a receiving device 12 for the hydrogen tank 11.

In a second process step 200, a hydrogen-permeation-inhibiting coating 5 is applied to the basic body 4. In this case, it is advantageous for the hydrogen-permeation-inhibiting coating 5 to also be applied to corners, edges and/or undercuts of the basic body 4, in order to achieve a shielding of the basic body 4 from hydrogen, that is as effective as possible.

In a third process step 300, a protective coating 9 is applied to the hydrogen-permeation-inhibiting coating 5. The protective coating 9 has a higher chemical and/or physical resistance than the hydrogen-permeation-inhibiting coating 5. As a result, the hydrogen-permeation-inhibiting coating 5 is protected from outside influences. This protective coating 9 is optional.

LIST OF REFERENCE SYMBOLS

1 Shielding device
2 Passenger compartment
3 Interior
4 Basic body
5 Hydrogen-permeation-inhibiting coating
6 Pigment
7 Lacquer
8 Floor wall
9 Protective coating
10 Exterior wall
11 Hydrogen tank
12 Receiving device
U Environment
100 First process step
200 Second process step
300 Third process step The foregoing disclosure has been set forth merely to illustrate the embodiments of the invention and is not intended to be limiting. Since modifications of the disclosed embodiments incorporating the spirit and substance of the embodiments of the invention may occur to persons skilled in the art, the embodiments of the invention should be construed to include everything within the scope of the appended claims and equivalents thereof.

What is claimed is:

1. A shielding device, comprising:
   a basic body, wherein the basic body has a fiber-reinforced composite material with a hydrogen-permeation-inhibiting coating and is constructed as a wall or wall segment of a passenger compartment of a motor vehicle, wherein
      the shielding device is disposed in in the passenger compartment of the motor vehicle, and the shielding device is configured to shield an interior of the passenger compartment of the motor vehicle from a hydrogen tank in the motor vehicle, and
      the basic body is arranged between the interior of the passenger compartment and a receiving device for the hydrogen tank, the hydrogen tank being disposed below the receiving device.

2. The shielding device according to claim 1, wherein the hydrogen-permeation-inhibiting coating has metallic pigments.

3. The shielding device according to claim 2, wherein the hydrogen-permeation-inhibiting coating has Cu and/or Al pigments.

4. The shielding device according to claim 3, wherein the metallic pigments have a plate-shaped or small-plate-shaped design.

5. The shielding device according to claim 4, wherein the hydrogen-permeation-inhibiting coating has a lacquer that binds metallic pigments.

6. The shielding device according to claim 5, wherein the shielding device is constructed as a floor wall or a floor wall segment of the passenger compartment.

7. The shielding device according to claim 6, wherein a protective coating is arranged on the hydrogen-permeation-inhibiting coating, the protective coating having a higher chemical and/or physical resistance than the hydrogen-permeation-inhibiting coating.

8. A passenger compartment of a motor vehicle, comprising:
   at least one exterior wall that separates the passenger compartment from an environment of the passenger compartment, wherein an exterior wall is constructed at least partly as a shielding device according to claim 7.

9. A motor vehicle having a hydrogen tank and a passenger compartment,
   wherein the passenger compartment is constructed like the passenger compartment according to claim 8.

10. A method of shielding an interior of a passenger compartment of a motor vehicle from a hydrogen tank in the motor vehicle, the method comprising the acts of:
    providing a passenger compartment of a motor vehicle, the motor vehicle having a hydrogen tank, the passenger compartment having at least one exterior wall, the at least one exterior wall having a basic body, the basic body
    having a fiber-reinforced composite material, and
    being arranged between the interior and a receiving device for a hydrogen tank, the hydrogen tank being disposed below the receiving device; and
    applying a hydrogen-permeation-inhibiting coating to the basic body.

11. The method according to claim 10, wherein the hydrogen permeation-inhibiting coating has metallic pigments.

12. The method according to claim 11, wherein a protecting coating is applied to the hydrogen-permeation-inhibiting coating, the protecting coating having a higher chemical and/or physical resistance than the hydrogen-permeation-inhibiting coating.

* * * * *